United States Patent [19]

Kim

[11] Patent Number: 5,795,260
[45] Date of Patent: Aug. 18, 1998

[54] TRANSMISSION CONTROL SYSTEM FOR AN ELECTRIC VEHICLE

[75] Inventor: Chun-ho Kim, Kwangmyung, Rep. of Korea

[73] Assignee: Kia Motors Corporation, Seoul, Rep. of Korea

[21] Appl. No.: 767,497

[22] Filed: Dec. 16, 1996

[30] Foreign Application Priority Data

Sep. 17, 1996 [KR] Rep. of Korea ............... 1996-40374

[51] Int. Cl.$^6$ ............................................. B60K 41/08
[52] U.S. Cl. ............................................. 477/20
[58] Field of Search ................................. 477/20

[56] References Cited

U.S. PATENT DOCUMENTS

| | | | |
|---|---|---|---|
| 5,287,772 | 2/1994 | Aoki et al. | 477/20 |
| 5,395,293 | 3/1995 | Matsumura et al. | 477/20 |
| 5,498,216 | 3/1996 | Bitsche et al. | 477/20 |

Primary Examiner—Dirk Wright

[57] ABSTRACT

Disclosed is a transmission control system for an electric vehicle, comprising: a motor; a transmission, connected to the motor without clutch, having a shift fork; a shift lever for selecting wheel speed range; a linkage hingedly connected to the shift lever; a shift rod connected to the shift fork of the transmission, a hydraulic pressure device for connecting the linkage and the shift rod, and for absorbing movement of the linkage and moving the shift rod in a determined time; a shift lever sensor for detecting movement of the shift lever; a motor speed sensor for detecting speed of the motor; a wheel speed sensor for detecting wheel speed; a shift fork sensor for detecting movement of the shift fork; an inverter for controlling the motor; and a control unit for controlling the inverter and the hydraulic pressure device in accordance with signals of the shift lever sensor, the motor speed sensor, the wheel speed sensor, and the shift fork sensor.

2 Claims, 3 Drawing Sheets

TRANSMISSION CONTROL SYSTEM FOR AN ELECTRIC VEHICLE

FIELD OF THE INVENTION

The present invention relates to a transmission control system for an electric vehicle and more particularly to a transmission control system for an electric vehicle which does not have any clutch and also to a transmission control system for an electric vehicle which can be shifted smoothly.

DESCRIPTION OF RELATED ART

Generally, electric vehicles were in practical use even before gasoline vehicles were invented. However, as the gasoline vehicle was developed in its accelerating ability, mounting ability, driving ability and high speed, the electric vehicle gradually disappeared.

However, in recent years, the electric vehicle has been watched as one which is good for the environmental. Therefore, many parts of the electric vehicle, for example, an electric motor, a controller, and a drive system, have been examined and developed.

The electric vehicle must be designed differently from the internal combustion engine vehicle, because the characteristics of the motor is different from that of the internal combustion engine. Specially, the power train including transmission must be designed in different ways from each other because the torque characteristic of the motor is different from that of the internal combustion engine.

But, the conventional electric vehicle usually adopts the transmission used in the internal combustion engine vehicle.

The conventional power train for an electric vehicle includes a motor, a flywheel and a clutch connected to the motor, a transmission, a final reduction gear, and a differential gear.

As for transmissions, the synchromesh type transmission is widely used in a conventional electric vehicle.

This type of transmission has an input shaft or clutch shaft having integral main drive gears and rotating with a clutch-driven plate(disc) and an output shaft having countergears and a synchronizer assembly. The synchronizer assembly consists of a hub, a sleeve and so forth. A shift fork is positioned in grooves in synchronizer sleeves and is connected to a shift lever by a linkage as a cable or a rod.

When the shift lever is applied, the movement of the shift lever is transferred to the shift fork by the linkage, and then the shift fork controls sleeve position.

That is, in conventional electric vehicles, shifting is accomplished while the clutch is being disengaged and the speeds of mating parts are being synchronized with each other.

Therefore, this type of transmission needs a clutch, which causes a complex structure and high cost to manufacture.

Also, since this type of transmission needs synchronization of mating parts, the movement of the shift lever is resisted until the synchronization of the mating parts, resulting in uncomfortable handling of the shift lever.

SUMMARY OF THE INVENTION

The present invention has been made in an effort to solve the above described problems of the conventional transmission system for an electric vehicle.

It is an object of the present invention to provide a transmission control system for an electric vehicle which has no clutch between the transmission and motor.

It is another object of the present invention to provide a shifting mechanism for an electric vehicle transmission which enables a shift lever to be moved smoothly.

The present invention focuses on the characteristic of the motor for an electric vehicle in comparison with the gasoline engine. That is, in an electric vehicle it is easy to control motor speed or motor torque, thus structure of the transmission can be simpler than that of the transmission used in internal combustion engine vehicle.

Also, since motor speed can be controlled easily and the speed synchronization of the mating parts can be easily accomplished, it is possible for the shift lever to be moved smoothly.

To achieve the above objects, the present invention provides a transmission control system for an electric vehicle, comprising: a motor; a transmission connected to said motor; a shift fork rod connected to said transmission; a shift lever for speed shifting having a lower end; a shift rod having an end secured to said shift fork and the other end having a hollow hole which has an elastic member; a linkage having an end supported by the elastic member and the other end hinged to a lower end of said shift lever; a shift lever sensor for detecting movement of said shift lever; a motor speed sensor for detecting motor speed; a wheel speed sensor for detecting wheel speed; a shift fork sensor for detecting movement of said shift fork; an inverter for controlling said motor; and a control unit for controlling said inverter in accordance with signals of said motor speed sensor, said wheel speed sensor and said shift lever sensor.

BRIEF DESCRIPTION OF THE DRAWINGS

The foregoing and other objects of the present invention will become more apparent from the detailed description below when taken in conjunction with the following drawings in which.

DETAILED DESCRIPTION OF THE PREFERRED EMBODIMENT

Preferred embodiment of the present invention will now be described in detail with reference to the accompanying drawings.

Figure 1:
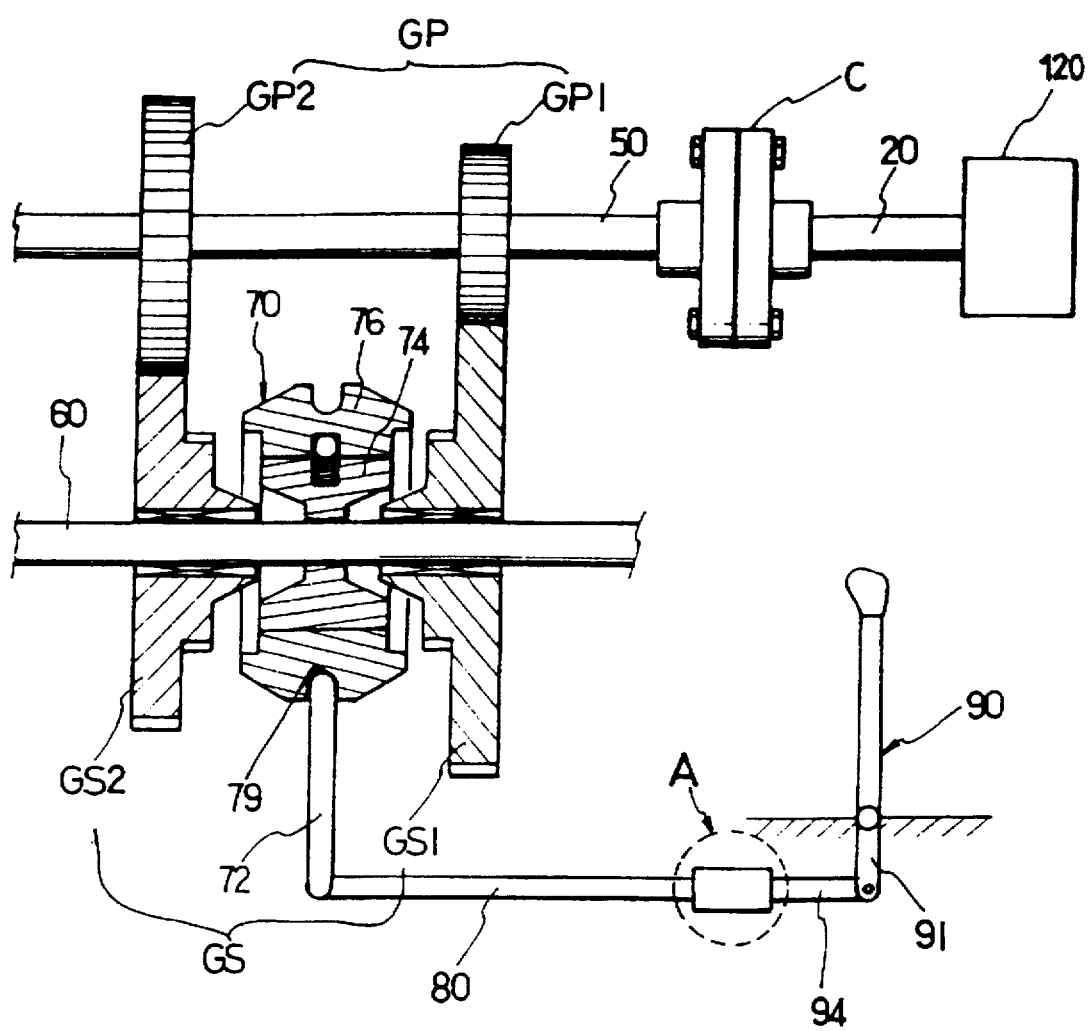
FIG. 1 is a schematic representation illustrating powerline including transmission for an electric vehicle in accordance with a preferred embodiment of the present invention.

Referring first to FIG. 1, in the powertrain for an electric vehicle, an input shaft 50 is directly connected to a motor shaft 20 through a coupling without any flywheels or any clutches. The input shaft 50 has main drive gears GP and the output shaft 60 has countergears GS and a synchronizer assembly 70. The main drive gears GP have a first speed gear GP1 and a second speed gear GP2. The countergears GS have a first speed countergear GS1 and a second speed countergear GS2.

The input shaft 50 rotates all the time the motor 120 is rotating, and also the main drive gears GP1 and GP2 rotate. In addition, since the countergears GS1 and GS2 are in a constant mesh with the main drive gears GP1 and GP2, they also rotate while the motor 120 is rotating.

The countergears GS1 and GS2 rotate independent of the output shaft 60 and are in constant mesh with the main drive gears GP1 and GP2, respectively.

The synchronizer assembly 70 is connected to a shift lever 90 through a shift fork 72, a shift rod 80 and a linkage 94. The synchronizer assembly 70 consists of a hub 74, a sleeve 76 and so forth. The synchronizer hub 74 is splined to the output shaft 60. The sleeve 76 is splined to the hub 74 but can slide fore and aft on the hub 74. The shift fork 72 is positioned in a groove 79 in the sleeve 76 and controls sleeve position. This assembly permits a smooth gear engagement without clashing by synchronizing the speeds of mating parts before they engage with each other.

The shift rod 80 has a hydraulic pressure device A connected to an end of the linkage 94. The other end of the linkage 94 is hingedly connected to a lower end 91 of the shift lever 90.

Figure 2:
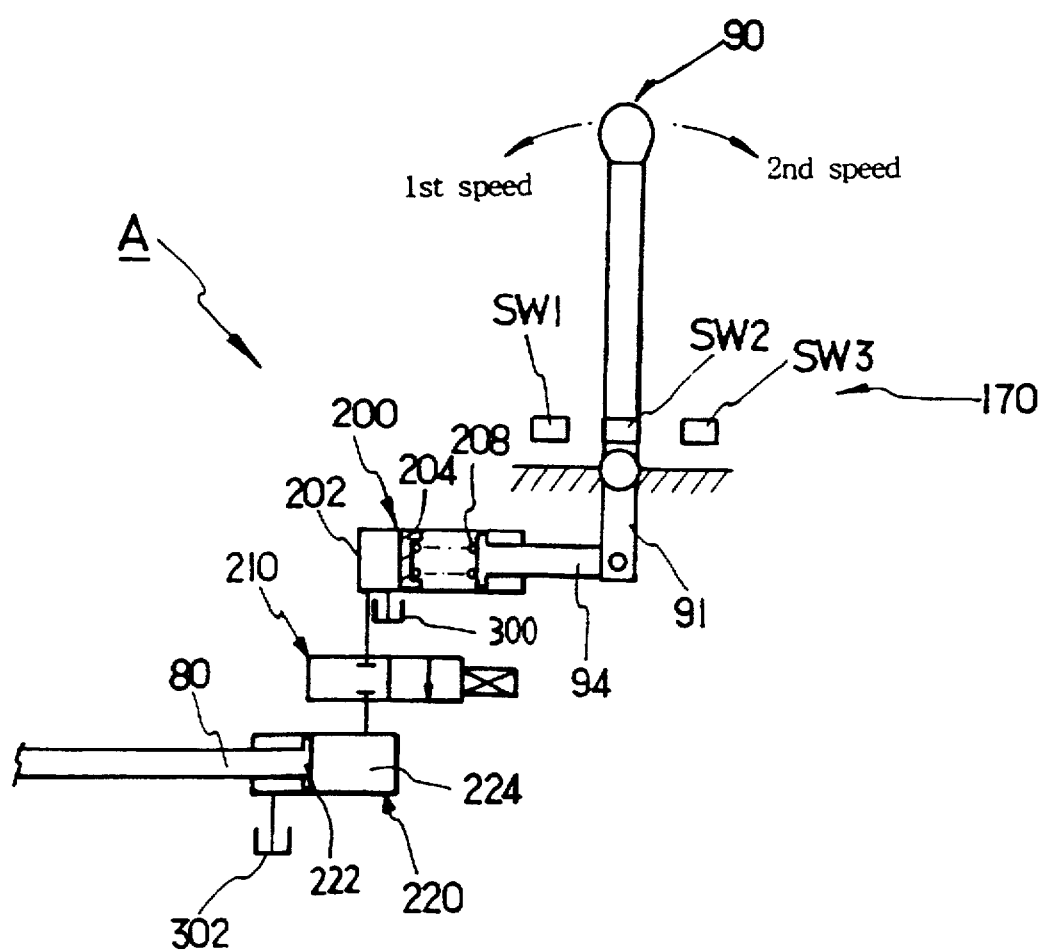
FIG. 2 is a detail view illustrating hydraulic pressure device for a transmission control system in accordance with the preferred embodiment of the present invention.

In FIG. 2 the hydraulic pressure device A is shown in detail. The hydraulic pressure device consists of three parts: a solenoid valve 210 and two actuators 200 and 220.

The first actuator 200 is a hollow hydraulic cylinder having a plate 204 which defines volume of a hydraulic oil chamber 202, and which is elastically supported by a spring 208 which is in contact with the linkage 94 which is also hingedly connected to a lower end 91 of the shift lever 90. The hydraulic oil is provided to the chamber 202 from a oil tank 300.

The hydraulic oil chamber 202 is connected to the second actuator 220 through the solenoid valve 210, which selectively have the hydraulic oil pass from the hydraulic oil chamber 202 to the second actuator 220.

The second actuator 220 includes a hydraulic oil chamber 224, a drain tank 302, and a piston 222 which defines an end of the shift rod 80.

Shift lever sensors or switches 170 (including SW1, SW2, and SW3) are mounted on a predetermined position where shift lever 90 passes and stops for accomplishing shifting.

Figure 3:
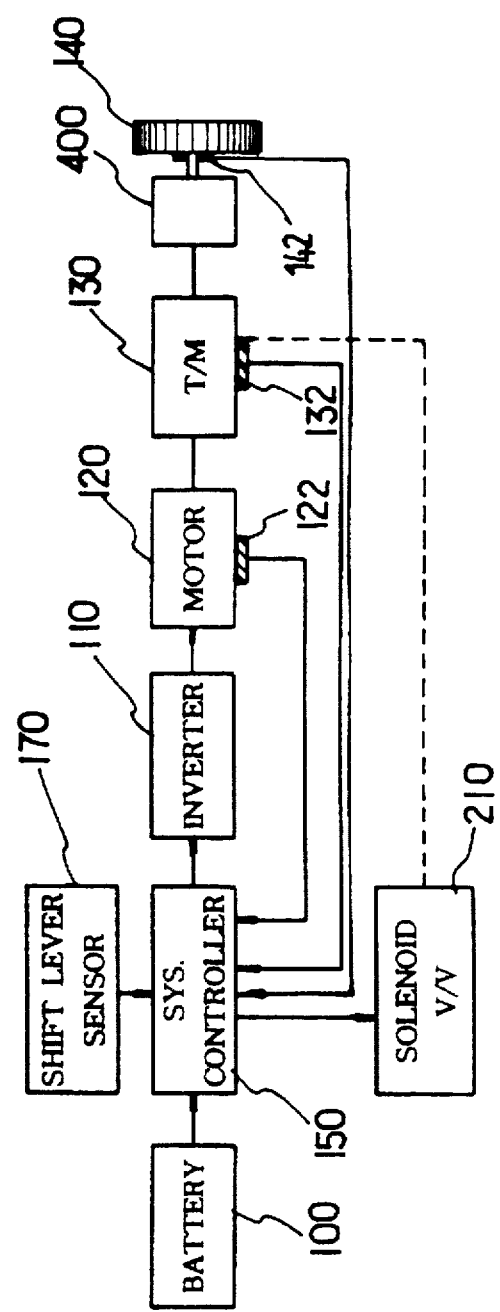
FIG. 3 is a schematic block diagram illustrating transmission control system for an electric vehicle in accordance with the preferred embodiment of the present invention.

Now referring to FIG. 3, the inventive transmission control system for an electric vehicle includes a motor 120 for converting electric energy to usable mechanical energy directly; a transmission 130 connected to the motor 120 without clutch; a shift lever sensor 170 for detecting the shift lever movement; a motor speed sensor 122 for detecting motor speed; a wheel speed sensor 142 for detecting wheel speed; a shift fork sensor 132 for detecting shift fork movement; an inverter 110 for controlling the motor 120; and a control unit 150 for controlling the inverter 110 and solenoid valve 210 in accordance with the motor speed sensor signal, the wheel speed sensor signal and the shift lever sensor signal. Reference number 100 in FIG. 3 indicates a battery for electric vehicles.

When the shift lever 90 is moved to the 2nd speed range, the rotation of the shift lever 90 pushes the linkage 94, which compresses the spring 208, which enhances hydraulic oil pressure in the hydraulic oil chamber 202.

By the way the movement of the shift lever 90 is detected by the shift lever sensor 170 and the controller 150 controls the motor speed in accordance with the wheel speed. When the motor speed reaches a desirable value which is proper for synchronization of the mating gears GP2 and GS2, the controller 150 let the solenoid valve 210 open and the compressed hydraulic oil in the hydraulic oil chamber 202 passes the valve 210 to the second actuator 220. Hydraulic oil in the second actuator 220 pushes the shift rod 80 to fulfill second speed range.

With the movement of the shift rod 80 the hydraulic oil in the second actuator 220 drains through the drain tank 302 and the hydraulic chamber 202 is refilled with the hydraulic oil from the oil tank 300.

That is, the shift lever movement is detected by the shift lever sensor 170, and then the shift lever sensor signal is provided to the control unit 150. The control unit 150 determines the output shaft speed and the countergear speed in accordance with the wheel speed sensor signal and the motor speed sensor signal, and then the control unit 150 controls the inverter 110 such that the output shaft speed is the same as the countergear speed.

When the synchronization of speed of the mating parts is accomplished, the synchronizer assembly 80 to move smoothly to the teeth 62 of the determined counter gear GS2. At this time, the compressed hydraulic oil pushes the shift rod 80 for full engagement of the synchronizer teeth 62 on the countergear GS2 and synchronizer assembly 70 by the action of the hydraulic pressure device A.

When the shift fork 72 gets to a desirable position, the shift fork sensor inform the control unit 150, which closes the solenoid valve 210, then the hydraulic oil does not flow any longer through the solenoid valve 210.

Also when the shift lever 90 is moved to the 1st speed range, the spring 84 is extended for a while in order for synchronization of the output shaft 60 and input shaft 50.

That is, when the movement of the shift lever 90 to the 1st speed range is recognized by the sensor 170, the motor 120 is controlled to rotate in the same speed with the output shaft 60, which can be determined by wheel speed.

As described above, since the transmission control system according to the present invention can be shifted without clutch, the gear shifting is simple and comfortable.

Also, since the transmission control system according to the present invention enables gear shifting smoothly due to the hydraulic pressure device, the gear shifting is smooth and comfortable to shift.

Although preferred embodiment of the present invention has been described in detail hereinabove, it should be clearly understood that many variations and/or modifications of the basic inventive concepts herein taught which may appear to those skilled in the present art will fall within the spirit and scope of the present invention, as defined in the appended claims.

What is claimed is:

1. A transmission control system for an electric vehicle, comprising:

a motor;

a transmission, connected to said motor without clutch, having a shift fork;

a shift lever for selecting wheel speed range;

a linkage hingedly connected to said shift lever;

a shift rod connected to the shift fork of said transmission, a hydraulic pressure device for connecting the linkage and said shift rod, and for absorbing movement of said linkage and moving said shift rod in a determined time;

a shift lever sensor for detecting movement of said shift lever;

a motor speed sensor for detecting speed of said motor;

a wheel speed sensor for detecting wheel speed;

a shift fork sensor for detecting movement of the shift fork;

an inverter for controlling said motor; and a control unit for controlling said inverter and said hydraulic pressure device in accordance with signals of said shift lever sensor, said motor speed sensor, said wheel speed sensor, and said shift fork sensor.

2. A transmission control system for an electric vehicle according to claim 1, wherein said hydraulic pressure device has (a) a first hydraulic actuator including a first hydraulic oil chamber volume of which is defined by a movable plate in accordance with the movement of said shift lever and which is provided hydraulic oil by a hydraulic oil tank, (b) a second actuator including a second hydraulic oil chamber, a movable piston, which defines an end of said shift rod, in accordance with the second hydraulic oil chamber volume, and a drain tank for draining hydraulic oil from the second hydraulic chamber, and (c) a solenoid valve for selectively controlling connection between the first and the second hydraulic oil chambers.

* * * * *